United States Patent
Nakaizawa

(10) Patent No.: US 10,075,600 B2
(45) Date of Patent: Sep. 11, 2018

(54) DISPLAY DEVICE, IMAGE FORMING APPARATUS, AND DISPLAY METHOD INCLUDING DISPLAY OF SOFT KEY ARRAY

(71) Applicant: KYOCERA Document Solutions Inc., Osaka (JP)

(72) Inventor: Tomoaki Nakaizawa, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 15/538,333

(22) PCT Filed: Dec. 2, 2015

(86) PCT No.: PCT/JP2015/083893
§ 371 (c)(1),
(2) Date: Jun. 21, 2017

(87) PCT Pub. No.: WO2016/104086
PCT Pub. Date: Jun. 30, 2016

(65) Prior Publication Data
US 2017/0339291 A1    Nov. 23, 2017

(30) Foreign Application Priority Data
Dec. 22, 2014 (JP) .................................. 2014-259165

(51) Int. Cl.
*H04N 1/00* (2006.01)

(52) U.S. Cl.
CPC ..... *H04N 1/00506* (2013.01); *H04N 1/00384* (2013.01); *H04N 1/00411* (2013.01); *H04N 2201/0094* (2013.01)

(58) Field of Classification Search
CPC ............ H04N 1/4413; H04N 1/00392; H04N 1/4433; G06F 21/36
USPC ...................... 358/1.14; 399/80, 81; 715/863
See application file for complete search history.

(56) References Cited

U.S. PATENT DOCUMENTS

| 8,504,842 B1* | 8/2013 | Meacham | G06F 3/0488 713/182 |
| 2010/0031346 A1* | 2/2010 | Kano | G06F 21/316 726/19 |

FOREIGN PATENT DOCUMENTS

JP     2008-102810 A     5/2008

* cited by examiner

*Primary Examiner* — Jamares Q Washington
(74) *Attorney, Agent, or Firm* — Studebaker & Brackett PC

(57) ABSTRACT

A display device (1) includes a display section (20), a detection section (30), a storage (40), and a controller (10). The detection section (30) detects a touch region (210) of the display region in which a user touches. The storage (40) stores therein a pattern (400). The controller (10) includes a determination section (101) and a display controller (103). The determination section (101) determines whether or not the touch region (210) matches the pattern (400). The display controller (103) causes the display section (20) to display a soft key array (220) upon the determination section (101) determining match.

7 Claims, 6 Drawing Sheets

DISPLAY DEVICE, IMAGE FORMING APPARATUS, AND DISPLAY METHOD INCLUDING DISPLAY OF SOFT KEY ARRAY

TECHNICAL FIELD

The present invention relates to a display device, an image forming apparatus, and a display method.

BACKGROUND ART

Downsizing of image forming apparatuses has been demanded recently. In response to such a demand, downsizing is achieved in an image forming apparatus including a touch panel in a manner that hardware keys are removed while a soft key array is displayed on the touch panel (screen). However, the soft key array displayed on the touch panel may occupy a display region of the touch panel.

In a keyboard display device disclosed in Patent Literature 1, video signals and a software keyboard displayed on a screen are synthesized and displayed as a screen. In a situation in which a user performs input using the keyboard, the keyboard is displayed opaquely or at low transparency. When no input is performed on the keyboard even after elapse of a predetermined time period, the keyboard is displayed at high transparency. The user checks a content displayed on the screen through the keyboard displayed at the high transparency.

CITATION LIST

Patent Literature

[Patent Literature 1] Japanese Patent Application Laid-Open Publication No. 2008-102810

SUMMARY OF INVENTION

Technical Problem

However, in the keyboard display device disclosed in Patent Literature 1, viewability of a region of the screen that overlaps with the keyboard is low for the user when the user performs input on the keyboard.

The present invention has been made in view of the foregoing problem and has its object of providing a display device, an image forming apparatus, and a display method that are enabled to display a soft key array on a touch panel by simple operation and in which impairment of viewability of a content displayed on the touch panel is avoided.

Solution to Problem

According to a first aspect of the present invention, a display device includes a display section, a detection section, a storage, and a controller. The detection section detects a touch region of the display section in which a user touches. The storage stores a pattern therein. The controller includes a determination section and a display controller. The determination section determines whether or not the touch region matches the pattern. The display controller causes the display section to display a soft key array upon the determination section determining match.

According to a second aspect of the present invention, an image forming apparatus includes an image forming section and the display device according to the first aspect of the present invention. The image forming section forms an image on a sheet.

According to a third aspect of the present invention, a display method is implemented by a display device including a display section. The display method includes: detecting a touch region of the display section in which a user touches; storing a pattern; determining whether or not the touch region matches the pattern; and causing the display section to display a soft key array on upon determination that the touch region matches the pattern.

Advantageous Effects of Invention

According to the present invention, the soft key array can be displayed on the touch panel by simple operation while impairment of visibility of a content displayed on the touch panel can be avoided.

DESCRIPTION OF EMBODIMENTS

The following describes embodiments of the present invention with reference to the drawings. However, the embodiments described below do not in any way limit the invention according to the scope of the claims. Furthermore, not all of the elements of configuration described in the embodiment are essential for achieving the effects of the present invention. Note that when the same reference sign is used in more than one of the drawings, the reference sign indicates the same element in each drawing.

First Embodiment

Figure 1:
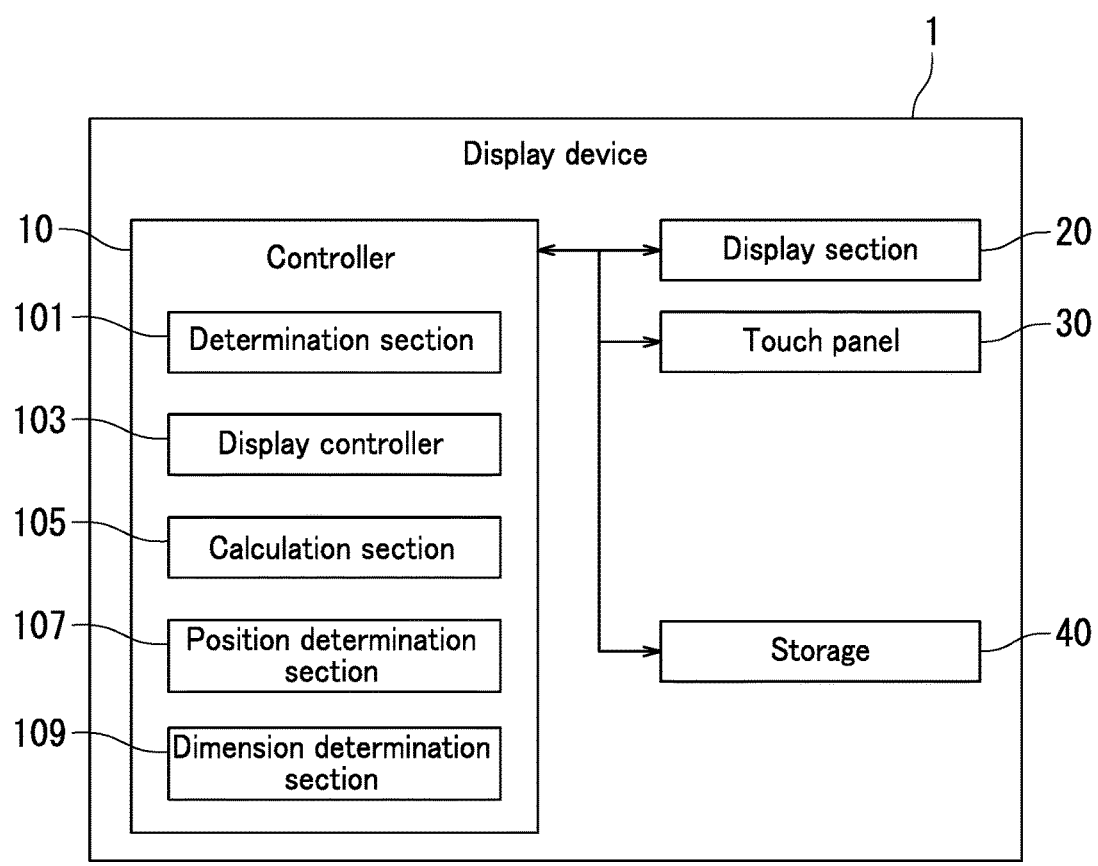
FIG. 1 is a block diagram illustrating a display device according to a first embodiment of the present invention.
Figure 2A:
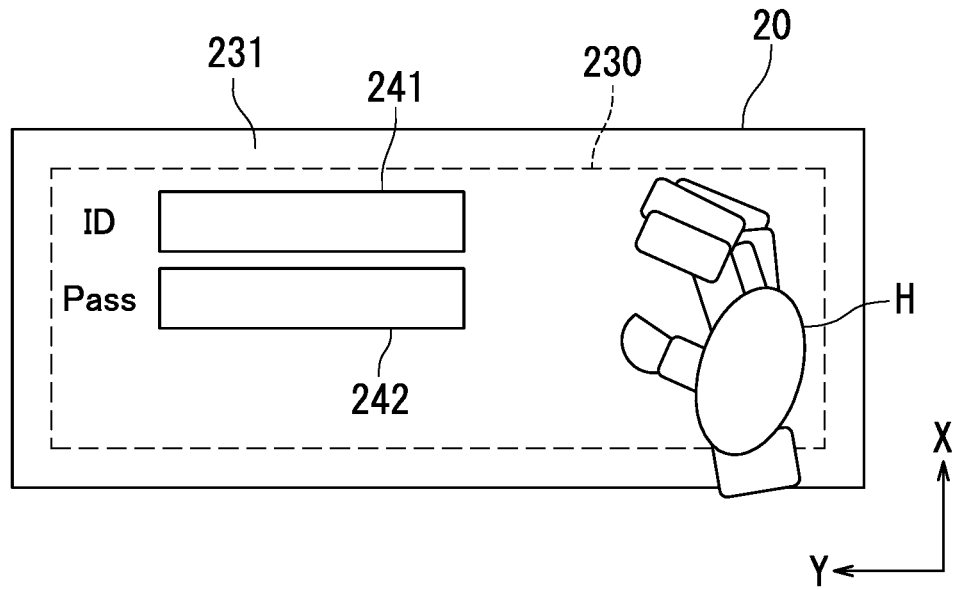
FIG. 2A is a view illustrating a state of a display section of the display device being touched by a user in the first embodiment of the present invention.
Figure 2B:
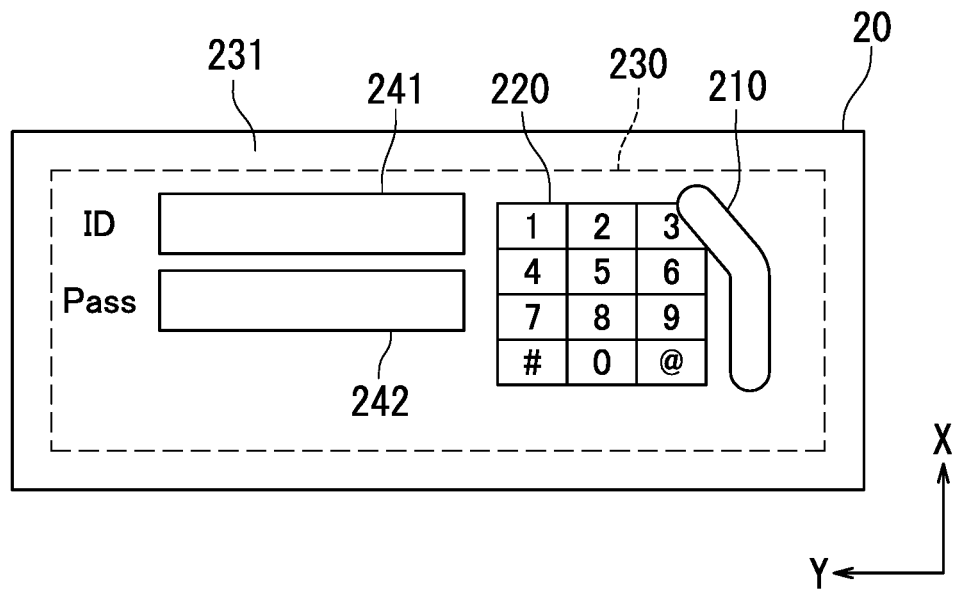
FIG. 2B is a diagram illustrating a state of the display section of the display device displaying a soft key array in the first embodiment of the present invention.

With reference to FIGS. 1-2B, a display device 1 according to a first embodiment of the present invention will be described. FIG. 1 is a block diagram illustrating the display device 1. The display device 1 includes a controller 10, a display section 20, a touch panel 30 that is a detection section, and a storage 40.

FIG. 2A illustrates a state of the display section 20 being touched by a user. FIG. 2B illustrates a state of the display section 20 displaying a soft key array 220. An X axis is parallel to a short side of the display section 20, while a Y axis is parallel to the long side thereof. That is, the Y axis is parallel to a longitudinal direction of the display section 20 while the X axis is parallel to a direction perpendicular to a longitudinal direction of the display section 20.

The display section 20 is for example a liquid crystal display. The display section 20 displays for example an operation screen that the user uses for operating an apparatus including the display device 1. The display section 20 further displays for example an ID input field 241 and a password input field 242. The user inputs an ID to the ID input field 241. The user inputs a password to the password input field 242. The touch panel 30 detects a touch operation and a touch region 210 that are made by a user's hand H touching the display section 20.

The storage 40 includes a main storage device (for example, a semiconductor memory) including for example a read only memory (ROM) and a random access memory (RAM) and an auxiliary storage device (for example, a hard disk drive). The ROM stores therein patterns and a variety of computer programs that the controller 10 executes. The patterns each are an image having a shape that the controller 10 compares with the touch region 210 detected by the touch panel 30. The patterns will be described later in detail.

The controller 10 includes a determination section 101 and a display controller 103. The controller 10 is for example a central processing unit (CPU).

The determination section 101 determines whether or not the touch region 210 matches any of the patterns stored in the storage 40. Specifically, for example, the storage 40 stores a plurality of patterns. The determination section 101 performs pattern matching between the touch region 210 and the respective patterns. The pattern matching in the present embodiment is a scheme to detect whether or not a pattern that can be deemed to match the touch region 210 is present among the plurality of patterns stored in the storage 40.

The display controller 103 causes the display section 20 to display the soft key array 220 upon the determination section 101 determining that any of the patterns matches the touch region 210. Specifically, the display controller 103 causes the display section 20 to display the soft key array 220 upon the determination section 101 determining that a pattern that can be deemed to match the touch region 210 is present.

The soft key array 220 in the present embodiment is a software numeric keypad but may be a software keyboard or the like. In order to input a value to the ID input field 241 or the password input field 242, the user touches a key of the soft key array 220 corresponding to the value to be input as a touch operation. The touch panel 30 detects a user touch operation toward the soft key array 220. The controller 10 inputs the value to the ID input field 241 or the password input field 242 based on the user touch operation that the touch panel 30 detects.

Note that the display section 20 may have a detection region 230. The detection region 230 is a region used for determining whether or not a user touch operation detected by the touch panel 30 is a mis-operation. In a configuration in which the display section 20 includes the detection region 230, the determination section 101 determines whether or not the touch region 210 matches any of the patterns upon the touch panel 30 detecting the touch region 210 in the detection region 230, that is, detecting a user touch operation in the detection region 230. When the touch panel 30 detects the touch region 210 outside the detection region 230, the determination section 101 does not determine whether or not the touch region 210 matches any of the patterns. That is, the determination section 101 determines that the touch panel 30 detects no touch region 210.

The detection region 230 is set optionally by the user. The display section 20 may further include a rim region 231. The rim region 231 is for example a peripheral edge of the display section 20. In a situation in which the touch panel 30 detects a touch operation in the rim region 231 of the display section 20, the touch operation may be a user mis-operation in many cases. In view of the foregoing, the detection region 230 is preferably set in a region other than the rim region 231 of the display section 20. That is, the rim region 231 is preferably different from the detection region 230. In the above configuration, a region other than the aforementioned detection region 230 corresponds to the rim region 231.

The determination section 101 may determine whether or not the touch region 210 matches any of the patterns upon detection of a part of the touch region 210 in the detection region 230. Alternatively, the determination section 101 may determine whether or not the touch region 210 matches any of the patterns upon detection of all part of the touch region 210 in the detection region 230.

Figure 3A:
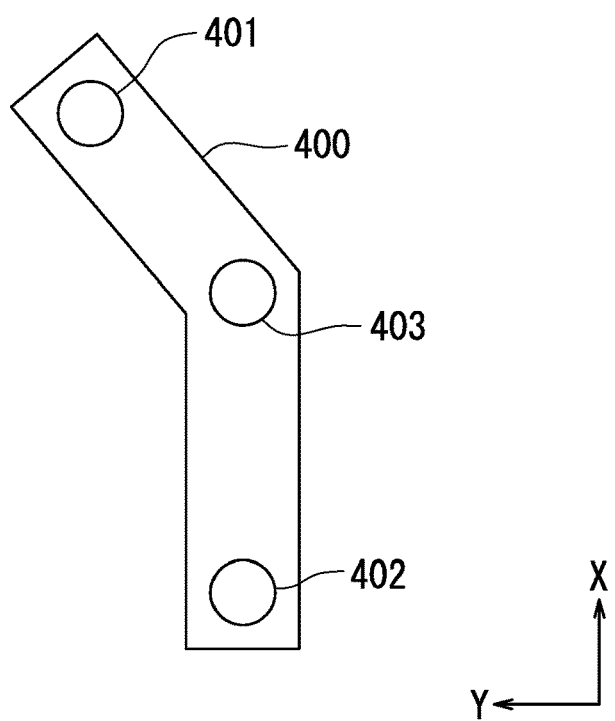
FIG. 3A is a diagram illustrating an example of a pattern stored in a storage of the display device according to the first embodiment of the present invention.
Figure 3B:
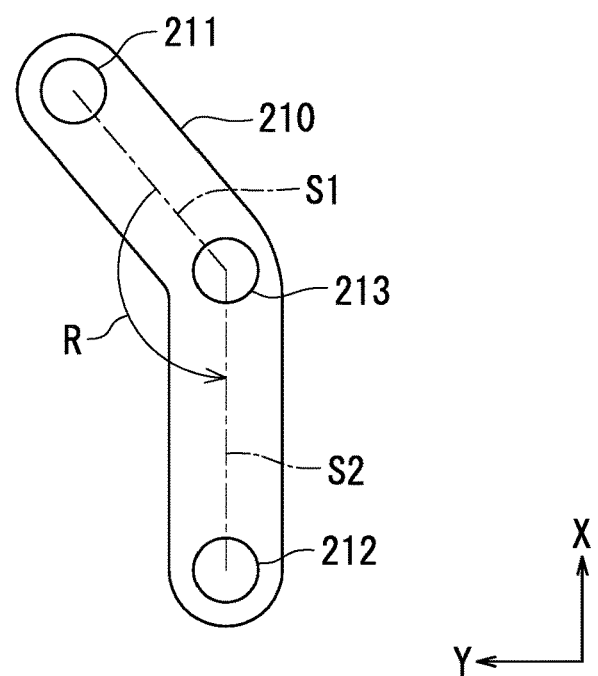
FIG. 3B is a diagram illustrating a touch region that a touch panel of the display device detects in the first embodiment of the present invention.

The soft key array 220 will be described next with reference to FIGS. 1, 3A, 3B, and 4. FIG. 3A illustrates an example of a pattern 400 stored in the storage 40. FIG. 3B illustrates the touch region 210. The controller 10 further includes a calculation section 105, a position determination section 107, and a dimension determination section 109. A display position and dimensions of the soft key array 220 in the display section 20 are determined by cooperation among the calculation section 105, the position determination section 107, and the dimension determination section 109.

The plurality of patterns 400 each have a first reference 401, a second reference 402, and a third reference 403. The first reference 401 is located at one of ends of the pattern 400. The second reference 402 is located at the other end of the pattern 400. The third reference 403 is located between the first and second references 401 and 402 in the pattern 400.

First, the calculation section 105 calculates a first point 211, a second point 212, and a third point 213 in the touch region 210 by referencing the pattern 400. Specific operation is as follows. The calculation section 105 calculates the first point 211 in the touch region 210 by referencing the first reference 401. The first point 211 is accordingly located at one of ends of the touch region 210. The calculation section 105 calculates the second point 212 in the touch region 210 by referencing the second reference 402. The second point 212 is accordingly located at the other end of the touch region 210. The calculation section 105 calculates the third point 213 in the touch region 210 by referencing the third reference 403. The third point 213 is accordingly located between the first and second points 211 and 212 in the touch region 210.

The calculation section 105 further calculates a first segment S1, a second segment S2, and an angle R. The first segment S1 is a segment connecting the first point 211 to the third point 213. The second segment S2 is a segment connecting the second point 212 to the third point 213. The angle R represents an inclination of the second segment S2 relative to the first segment S1. Specific examples of respective methods for calculating the first and second segments S1 and S2 and the angle R will be described later.

Figure 4:
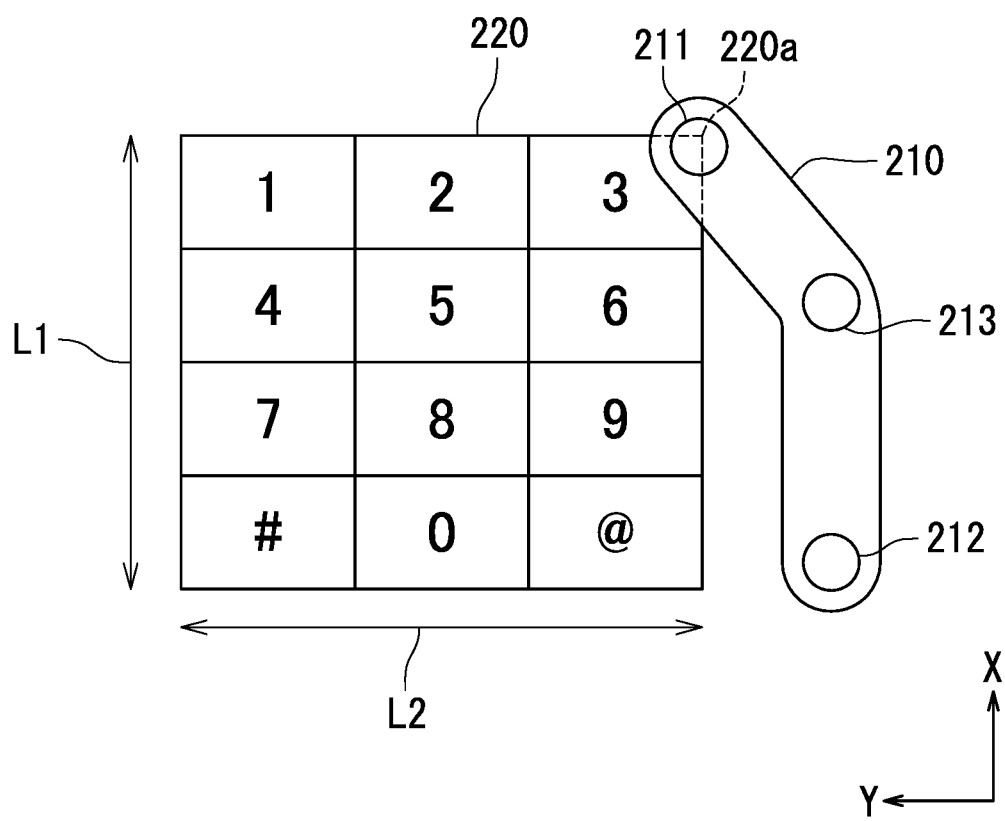
FIG. 4 illustrates the soft key array displayed based on the touch region on the display section of the display device according to the first embodiment of the present invention.

FIG. 4 illustrates the soft key array 220 displayed based on the touch region 210. The position determination section 107 determines a display position of the soft key array 220 in the display section 20 based on the first point 211. The soft key array 220 in the present embodiment is in a rectangular shape having four corners. The position determination section 107 determines a display position of the soft key array 220 for example so that a specific corner of the four corners of the soft key array 220 is located at the first point 211. In the present embodiment, the position determination section 107 determines a display position of the soft key array 220 so that a right upper corner 220a of the soft key array 220 in FIG. 4 is located at the first point 211.

Note that the position determination section 107 can determine a display position of the soft key array 220 so that any of the four corners of the soft key array 220 is located at the first point 211. For example, the position determination section 107 may determine a display position of the soft key array 220 so that the upper left corner of the soft key array 220 in FIG. 4 is located at the first point 211. Alternatively, the position determination section 107 can determine a display position of the soft key array 220 so that any point in the soft key array 220 is located at the first point 211. Yet, the position determination section 107 can determine a display position of the soft key array 220 so that any point in the soft key array 220 is located at the second or third point 212 or 213.

The dimension determination section 109 determines a first dimension L1 of the soft key array 220 according to the first and second points 211 and 212. The first dimension L1 of the soft key array 220 is a dimension of the soft key array 220 along the X axis. Specifically, the dimension determination section 109 determines a length from the first point 211 to the second point 212 along the X axis as the first dimension L1 of the soft key array 220.

The dimension determination section 109 further determines a second dimension L2 of the soft key array 220 according to the angle R. The second dimension L2 of the soft key array 220 is a dimension of the soft key array 220 along the Y axis. In a situation in which for example the user touches to operate the soft key array 220 using a right thumb, the smaller the angle R is, the larger a movable range of the right thumb is in a positive Y direction. In view of the foregoing, the dimension determination section 109 sets the second dimension L2 larger as the angle R is smaller and smaller as the angle R is larger. As a result, operability of the soft key array 220 for a user can be enhanced. Note that maximum and minimum values may be set for the second dimension L2 determined according to the angle R.

The display controller 103 causes the display section 20 to display the soft key array 220 according to the display position determined by the position determination section 107 and the first and second dimensions L1 and L2 determined by the dimension determination section 109. The soft key array 220 is displayed on the display section 20 accordingly. The soft key array 220 has a vertical width (length along the X axis) that is the first dimension L1. The soft key array 220 has a horizontal width (length along the Y axis) that is the second dimension L2.

The following describes a specific example of the soft key array 220 displayed on the display section 20. A touch point that the touch panel 30 detects is represented by position coordinates (X, Y). In the present specific example, the first point 211 in the touch region 210 is represented by position coordinates (3500, 1000). The second point 212 in the touch region 210 is represented by position coordinates (1500, 500). The third point 213 in the touch region 210 is represented by position coordinates (3100, 500). The first segment S1 is calculated from the first and third points 211 and 213 by the Pythagorean theorem. The second segment S2 is calculated from the second and third points 212 and 213 by the Pythagorean theorem. The angle R of the second segment S2 relative to the first segment S1 is calculated by the Pythagorean theorem and about 128 degrees in the present specific example.

First, the position determination section 107 determines a display position of the soft key array 220. Position coordinates of the corner 220a of the soft key array 220 are determined as position coordinates (3500, 1000) of the first point 211.

Next, the dimension determination section 109 determines the first dimension L1 of the soft key array 220. A length from the first point 211 to third point 213 along the Y axis is 2000 (=3500−1500) in terms of pixels. The dimension determination section 109 accordingly determines the first dimension L1 as 2000 in terms of pixels. Next, the dimension determination section 109 determines the second dimension L2 of the soft key array 220. The angle R of the second segment S2 relative to the first segment S1 is about 128 degrees. Given for example that a reference value of the second dimension L2 of the soft key array 220 is 1500 in terms of pixels and a reference value of the angle R is 90 degrees, the angle R in the present specific example is large. In the above situation, the second dimension L2 is set smaller than the reference value. The reference value of the angle R for the angle R is (90/128), for example. Accordingly, the second dimension L2 is (1500)×(90/128) =1055 (in terms of pixels).

The soft key array 220 in the present embodiment is displayed on the display section 20 upon determination that the touch region 210 matches the pattern 400. In the above configuration, the user can cause the display section 20 to display the soft key array 220 by touching the display section 20 so that the touch region 210 matches the pattern 400. As a result, the soft key array 220 can be displayed on the display section 20 by simple user operation.

Furthermore, in the present embodiment, the soft key array 220 is displayed on the display section 20 according to a position at which the user touches in the display section 20. In the above configuration, the soft key array 220 can be displayed at any location on the display section 20 by a simple user operation. As a result, the user can cause the soft key array 220 to be displayed on the display section 20 in a manner that impairment of visibility of a content displayed on the display section 20 can be avoided.

Moreover, in the present embodiment, the soft key array 220 having a size corresponding to that of the user's hand H is displayed on the display section 20. As a result, operability of the soft key array 220 for the user can be enhanced.

In addition, in the present embodiment, the user can operate the soft key array 220 in a sense of operating a smartphone in a situation in which the user touches the soft key array 220 for operation using the thumb. As a result, operability of the soft key array 220 for the user can be further enhanced in a case where the user operates a smartphone daily.

Yet in the present embodiment, in a situation in which the pattern 400 has a shape corresponding to a side surface of the user's hand H on a side of a little finger, the user can touch the soft key array 220 for operation using the thumb while hiding the soft key array 220 using a palm. Accordingly, in a situation in which the user inputs information having high confidentiality by touching the soft key array 220, confidentiality of the information can be kept.

Figure 5:
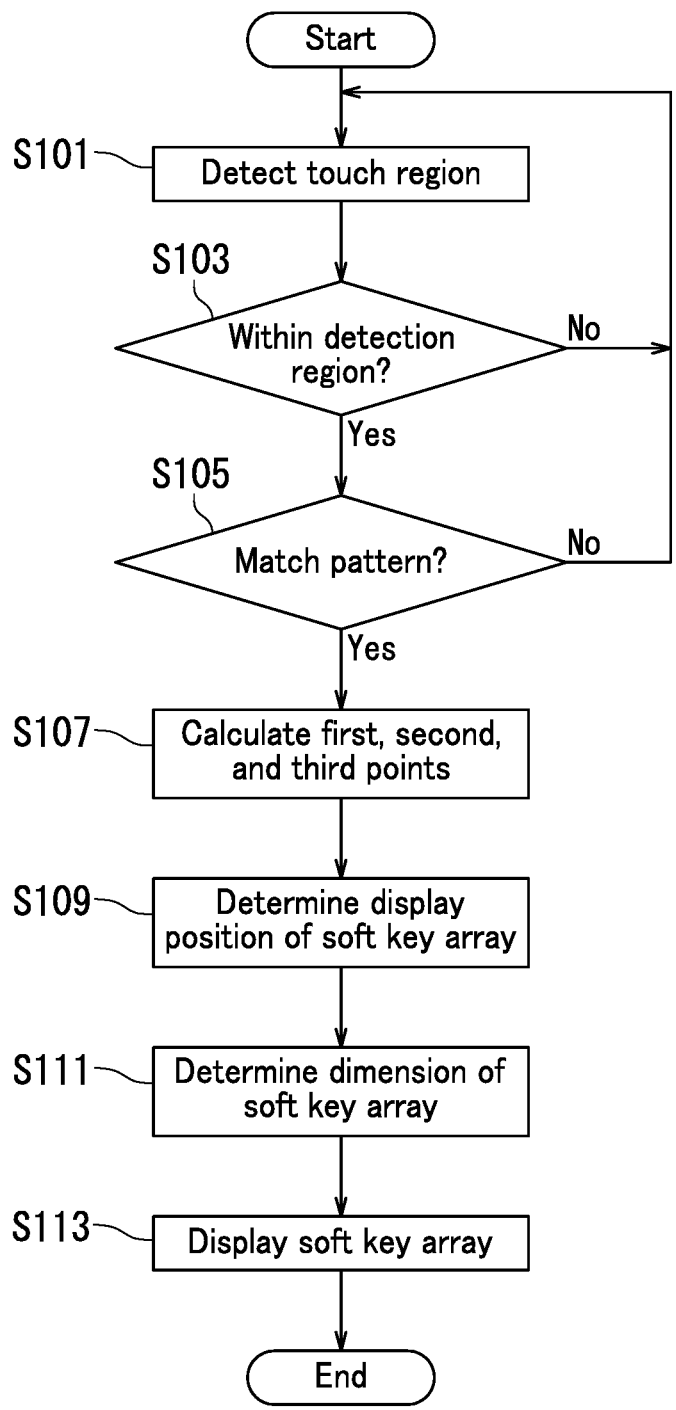
FIG. 5 is a flowchart depicting a display method that the display device implements according to the first embodiment of the present invention.

A display method that the display device 1 implements will be described with reference to FIGS. 1-5. FIG. 5 is a flowchart depicting the display method. The soft key array 220 is displayed on the display section 20 in accordance with the display method. According to the display method, the soft key array 220 displayed based on the touch region 210 touched by the hand H and detected by the touch panel 30 is displayed through execution of Steps S01 to S113. Specific operation is as follows.

At Step S101, the touch panel 30 detects the touch region 210 touched by the user's hand H in the display section 20. At Step S103, the determination section 101 determines whether or not the touch panel 30 detects the touch region 210 in the detection region 230. When a negative determination is made (No) at Step S103, the routine proceeds to Step S101. That is, when the touch panel 30 detects a touch operation in a region other than the detection region 230, the determination section 101 determines the detected touch operation as a mis-operation. When a positive determination is made (Yes) at Step S103, the routine proceeds to Step S105.

At step S105, the determination section 101 determines whether or not the touch region 210 matches any pattern 400. When a negative determination is made (No) at Step S105, that is, when the determination section 101 determines that the touch region 210 does not match any of the plurality of patterns stored in the storage 40, the routine returns to Step S101. When a positive determination is made (Yes) at Step S105, that is, when the determination section 101 determines that the touch region 210 matches a pattern 400 stored in the storage 40, the routine proceeds to Step S107.

At Step S107, the calculation section 105 calculates the first, second, and third references 211, 212, and 213 of the touch region 210 by referencing the pattern 400.

At Step S109, the position determination section 107 determines a display position of the soft key array 220 in the display section 20 based on the first point 211. As Step S111, the dimension determination section 109 determines the first and second dimensions L1 and L2 of the soft key array 220 based on the first, second, and third points 211, 212, and 213.

At Step S113, the display controller 103 causes the display section 20 to display the soft key array 220 according to the display position of the soft key array 220 in the display section 20 that is determined at Step S109 and the first and second dimensions L1 and L2 determined at Step S111.

Second Embodiment

Figure 6:
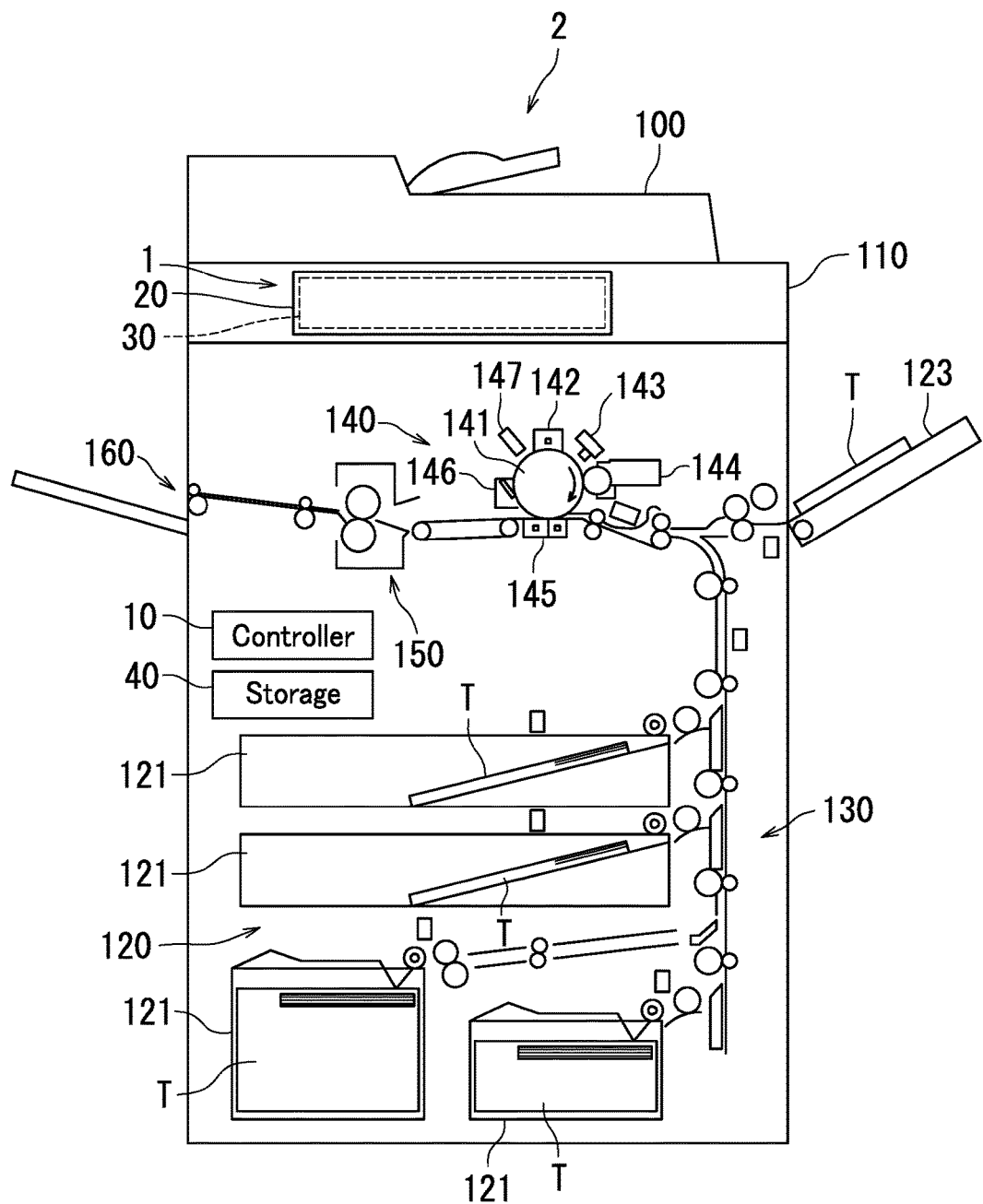
FIG. 6 is a diagram illustrating an image forming apparatus according to a second embodiment of the present invention.

The following describes an image forming apparatus 2 according to a second embodiment of the present invention with reference to FIG. 6. FIG. 6 illustrates the image forming apparatus 2. The image forming apparatus 2 is for example a copier, a printer, a facsimile machine, or a multifunction peripheral. Note that the multifunction peripheral includes at least two devices among a copier, a printer, and a facsimile machine.

The image forming apparatus 2 includes a controller 10, a display section 20, a touch panel 30, a storage 40, a document conveyance section 100, an image reading section 110, an accommodation section 120, a conveyance section 130, an image forming section 140, a fixing section 150, and an ejection section 160. Sheets T are conveyed in the interior of the image forming apparatus 2 in a sheet conveyance direction. The controller 10 functions as the controller 10 in the first embodiment. The display section 20 functions as the display section 20 in the first embodiment. The touch panel 30 functions as the touch panel 30 in the first embodiment. In the above configuration, the controller 10, the display section 20, and the touch panel 30 constitute the display device 1 in the first embodiment.

The document conveyance section 100 conveys an original document toward the image reading section 110. The image reading section 110 generates image data by reading an image of the original document. The accommodation section 120 accommodates the sheets T. The accommodation section 120 includes a cassette 121 and a manual feed tray 123. The sheets T are loaded on the cassette 121. The sheets T are fed one at a time from the cassette 121 or the manual feed tray 123 to the conveyance section 130. The sheets T are for example plain paper, copy paper, recycled paper, thin paper, thick paper, glossy paper, or overhead projector (OHP) sheets.

The controller 10 controls respective elements of the image forming apparatus 2. Specifically, the controller 10 controls the display section 20, the touch panel 30, the document conveyance section 100, the image reading section 110, the accommodation section 120, the conveyance section 130, the image forming section 140, and the fixing section 150 through execution of computer programs stored in the storage 40. The controller 10 is for example a central processing unit (CPU). The touch panel 30 is disposed for example on a display surface of the display section 20.

The conveyance section 130 conveys the sheet T to the image forming section 140. The image forming section 140 includes a photosensitive drum 141, a charger 142, an exposure section 143, a development section 144, a transfer section 145, a cleaning section 146, and a static eliminating section 147, as illustrated in FIG. 1. The image forming section 140 forms (prints) an image on the sheet T as follows.

The charger 142 charges a surface of the photosensitive drum 141. The exposure section 143 irradiates the surface of the photosensitive drum 141 with light based on the image data generated by the image reading section 110 or image data stored in the storage 170. As a result, an electrostatic latent image corresponding to the image data is formed on the surface of the photosensitive drum 141.

The development section 144 develops the electrostatic latent image formed on the surface of the photosensitive drum 141 to form a toner image on the surface of the photosensitive drum 141. When the sheet T is supplied between the photosensitive drum 141 and the transfer section 145, the transfer section 145 transfers the toner image to the sheet T. The cleaning section 146 removes residual toner from the surface of the photosensitive drum 141. The static eliminating section 147 removes residual charge on the surface of the photosensitive drum 141.

The sheet T to which the toner image has been transferred is conveyed toward the fixing section 150. The fixing section 150 fixes the toner image to the sheet T by applying heat and pressure to the sheet S. The sheet S is conveyed to the ejection section 160 once the image has been fixed thereto. The ejection section 160 ejects the sheet T.

As has been described so far with reference to FIGS. 1 and 6, the image forming apparatus 2 in the second embodiment includes the display device 1 similar to that in the first embodiment described with reference to FIGS. 1-5. In the above configuration, the second embodiment can offer the same advantages as in the first embodiment.

The first and second embodiments have been described so far with reference to FIGS. 1-6. However, the present invention is of course not limited to the above embodiments and may be practiced in various forms without deviating from the essence thereof (for example, as explained below in sections (1) and (5)). The drawings schematically illustrate elements of configuration in order to facilitate understanding, and properties of elements of configuration illustrated in the drawings, such as thickness, length, and number thereof, may differ from actual properties thereof in order to facilitate preparation of the drawings. Shapes, dimensions, etc. of the elements of configuration given in the above embodiment are merely examples that do not impart any particular limitations and may be altered in various ways, so long as such alterations do not substantially deviate from the configuration of the present invention.

(1) As has been described with reference to FIGS. 1 and 3A-5, the display position, the first dimension L1, and the second dimension L2 of the soft key array 220 are determined by cooperation among the calculation section 105, the position determination section 107, and the dimension determination section 109. However, at least one of the display position and the first and second dimensions L1 and L2 of the soft key array 220 may be determined by cooperation among the calculation section 105, the position determination section 107, and the dimension determination section 109. Alternatively, the display position and the first and second dimensions L1 and L2 of the soft key array 220 may each be a predetermined value.

(2) As has been described with reference to FIGS. 2B and 4, the soft key array 220 is a software numeric keypad. However, a plurality of keys included in the soft key array 220 is not limited in layout and can be arranged in any array by a user. In a situation in which the soft key array 220 is displayed on the display section 20 in order that a user inputs highly confidential information, layout of the plural keys may be changed each time the soft key array 220 is displayed on the display section 20.

(3) As has been described with reference to FIG. 2A, the user touches the display section 20 using a right hand. However, the user may touch the display section 20 using a left hand. In the above situation, the storage 40 stores therein a pattern for pattern matching with a touch region 210 of the display section 20 in which a right hand touches and a pattern for pattern matching with a touch region 210 of the display section 20 in which a left hand touches.

(4) As has been described with reference to FIG. 3A, the example of the pattern 400 is substantially in an L-shape. However, the shape of the pattern 400 may be any shape.

(5) As has been described with reference to FIGS. 3A and 3B, the pattern 400 includes the three references (the first reference 401, the second reference 402, and the third reference 403). However, the pattern may include a single reference or a plurality of references other than the three references.

INDUSTRIAL APPLICABILITY

The present invention is applicable to respective fields of a display device and an image forming apparatus including a display device.

The invention claimed is:
1. A display device comprising:
a display section;
a detection section configured to detect a touch region of the display section in which a user touches;
a storage configured to store a pattern therein; and
a controller, wherein
the controller includes:
 a determination section configured to determine whether or not the touch region matches the pattern;
 a display controller configured to cause the display section to display a soft key array upon the determination section determining match;
 a calculation section configured to calculate a first point located at one of ends of the touch region by referencing the pattern; and
 a position determination section configured to determine a display position of the soft key array on the display section based on the first point,
the calculation section further calculates a second point located at another end of the touch region by referencing the pattern, and
the controller further includes a dimension determination section configured to determine a first dimension of the soft key array in a direction perpendicular to a longitudinal direction of the display section according to the first and second points.

2. The display device according to claim 1, wherein the calculating section further calculates
 a third point in the touch region located between the first and second points by referencing the pattern,
 a first segment connecting the first point to the third point,
 a second segment connecting the third point to the second point, and
 an angle representing an inclination of the second segment relative to the first segment, and
the dimension determination section determines a second dimension of the soft key array in the longitudinal direction of the display section according to the angle.

3. The display device according to claim 1, wherein the display section has a detection region, and
when the detection section detects the touch region in the detection region, the determination section determines whether or not the touch region matches the pattern.

4. The display device according to claim 1, wherein the pattern has a shape that is to be compared with the touch region by the determination section.

5. The display device according to claim 3, wherein the display section further has a rim region different from the detection region,
the rim region corresponds to a peripheral edge of the display section, and
when the detection section detects the touch region in the rim region, the determination section does not determine whether or not the touch region matches the pattern.

6. An image forming apparatus comprising:
the display device according to claim 1; and
an image forming section configured to form an image on a sheet.

7. A display method that a display device including a display section implements, comprising:
detecting a touch region of the display section in which a user touches;
storing a pattern;
determining whether or not the touch region matches the pattern;
causing the display section to display a soft key array on upon determination that the touch region matches the pattern;
calculating a first point located at one of ends of the touch region by referencing the pattern;
determining a display position of the soft key array on the display section based on the first point;
calculating a second point located at another end of the touch region by referencing the pattern; and determining a dimension of the soft key array in a direction perpendicular to a longitudinal direction of the display section according to the first and second points.

* * * * *